US007087858B2

(12) United States Patent
Egashira

(10) Patent No.: US 7,087,858 B2
(45) Date of Patent: Aug. 8, 2006

(54) LASER BEAM MACHINING SYSTEM AND LASER BEAM MACHINING METHOD USING THE SAME

(75) Inventor: Ichiro Egashira, Kanagawa (JP)

(73) Assignee: Amada Company, Limited (JP)

( * ) Notice: Subject to any disclaimer, the term of this patent is extended or adjusted under 35 U.S.C. 154(b) by 132 days.

(21) Appl. No.: 10/220,062

(22) PCT Filed: Feb. 28, 2001

(86) PCT No.: PCT/JP01/01487

§ 371 (c)(1),
(2), (4) Date: Nov. 5, 2002

(87) PCT Pub. No.: WO01/62431

PCT Pub. Date: Aug. 30, 2001

(65) Prior Publication Data

US 2003/0127440 A1 Jul. 10, 2003

(30) Foreign Application Priority Data

Feb. 28, 2000 (JP) .................................... 2000-051879

(51) Int. Cl.
*B23K 26/12* (2006.01)

(52) U.S. Cl. ................................................ 219/121.82
(58) Field of Classification Search ............ 219/121.67, 219/121.68, 121.69, 121.7, 121.71, 121.72, 219/121.82, 121.86; 266/69, 77; 414/744.1; 901/42

See application file for complete search history.

(56) References Cited

U.S. PATENT DOCUMENTS 4,659,902 A    4/1987  Swensrud et al. ........... 219/121
5,493,095 A  * 2/1996  Bruschi et al. .......... 219/121.75
5,560,843 A  * 10/1996 Koike et al. ............ 219/121.48
6,631,688 B1 * 10/2003 Maag ......................... 112/118

FOREIGN PATENT DOCUMENTS

JP    60 082287    5/1985
JP    11 028592    2/1999

OTHER PUBLICATIONS

Tatsuhiro, Tsuda, Translation to JP 11–28592, pp. 1–3. 8/97.*
Official Communication from European Patent Office dated Jul. 30, 2003.

* cited by examiner

*Primary Examiner*—Kiley Stoner
*Assistant Examiner*—Jonathan Johnson
(74) *Attorney, Agent, or Firm*—Blank Rome LLP

(57) ABSTRACT

The object of this invention is to provide a laser beam machining system and a laser beam machining method, wherein the working environment for the laser beam machining in the safety cabin is not impaired, and carrying out of the machined work can be performed without causing a shift of the machined work on the machining table, and also, without the laser beam machining being suspended, thereby enabling improvement in the productivity. At least one carriage of two, first and second carriages (11), (19) placed in a safety cabin (29) is moved back and forth above a machining table, and a laser machining head provided in that carriage is moved right and left, to thereby perform laser beam machining with respect to a work (W) on a machining table (7 or 9). The second carriage is moved back and forth above the machining table (7 or 9), so that a holding device (25) provided in the second carriage is moved right and left, to thereby hold and carry the machined work (W). Features of double carriages (11, 19) in the safety cabin (29) can be fully utilized, enabling improvement in the productivity.

7 Claims, 5 Drawing Sheets

LASER BEAM MACHINING SYSTEM AND LASER BEAM MACHINING METHOD USING THE SAME

TECHNICAL FIELD

The present invention relates to a laser beam machining system and a laser beam machining method using this laser beam machining system.

BACKGROUND ART

Conventionally, at the time of laser beam machining by a laser beam machine 101, it is necessary to cover the whole laser beam machine 101 including a machining table 103, on which a work W is placed, with a safety cabin 105, as shown in FIG. 4, from a viewpoint of safety of the operator and working environment. Especially, in EC countries, in order to acquire the "CE mark", the measure for covering the laser beam machine with the safety cabin 105 is necessary and indispensable. It is considered that the similar tendency will also dominate the Japanese market.

Generally, in the laser beam machine 101 in which a carriage 109 for supporting the laser machining head 107 is single in FIG. 4, a separately disposed manipulator 111 has been used to unload a machined work W (product G in FIG. 4). For example, the manipulator 111 is able to travel freely in the back and forth direction (X-axis direction), and the manipulator 111 has a holding device 113 for holding the work W, provided thereon so as to be able to go freely up and down and to move freely right and left. As a result, the holding device 113 is disposed so as to be moved and positioned freely back and forth (X axis), right and left (Y axis), and up and down (Z axis).

In the laser beam machine 101 capable of carrying in and out the work W, as in the case where a shuttle table 115 is provided as a machining table 103 for placing the work W thereon, the machined work W and a skeleton are carried out at the same time while a new work W is machined.

When the above-described laser beam machine 101 is completely covered with the safety cabin 105, it is necessary to open or close a door 117 disposed on the side of the safety cabin, after the laser beam machining has been suspended, in view of the purpose of the safety cabin 105.

In the conventional laser beam machining system, needless to say, safety and being convenient are two sides of the system, and performing the laser beam machining with the laser beam machine 101 covered with the safety cabin 105 has many problems in speed-up and efficiency improvement. Moreover, the safety cabin 105 becomes a cause of a delay in labor saving from a viewpoint of the productivity and care with respect to a defect of the work W.

Moreover, in the case of the laser beam machine 101 comprising the shuttle table 115, there is a problem in that when the machined work W carried out on the shuttle table 115 is picked up by the manipulator 111 (takeout loader or unloader) in order to take it out from the skeleton, the work W is shifted, thereby finally, it may not be taken out.

On the other hand, there is a problem in that after the cutting process of the work W by means of the laser beam machining has been finished, when the machined work W is picked up by the manipulator 111, the work W may not be taken out due to inclination, depending on the shape of the work W.

Therefore, as shown in FIG. 6, the laser beam machining is suspended in the middle of the cutting process of the work W, slightly leaving the uncut portion N (unmachined portion), shown by a two-dot chain line, and the side of the cut portion C of the work W is picked up in the direction shown by an arrow, as shown in FIG. 7, by the holding device 113 of the manipulator 111, and thereafter, the remaining uncut portion N is cut by the laser beam machining. The machined work W is taken out by the manipulator 111, and accumulated in the product accumulation area, as shown in FIG. 4, and the accumulated machined works W (products G) are taken out by a forklift, and assorted manually.

In this case, when the work W is picked up by the manipulator 111 described above, in the middle of the cutting process and after the cutting process of the work, as shown in FIG. 5, it is necessary to suspend the laser beam machining to open and close the door 117 of the safety cabin 105. Accordingly, in other words, the time required for opening and closing the door 117 of the safety cabin 105 is the time that does not contribute to the productivity, since the laser beam machining cannot be performed during that time.

In detail, the above-described series of steps comprise steps of: (1) performing laser beam machining with respect to a work W halfway, (2) opening the door 117 of the safety cabin 105 (3) letting the manipulator 111 enter into the safety cabin 105 from the door 117, (4) closing the door 117 of the safety cabin 105, (5) picking up the work W by the manipulator 111, (6) performing laser beam machining with respect to the remaining portion of the work W, (7) taking out the machined work W by the manipulator 111, (8) opening the door 117 of the safety cabin 105, (9) moving the manipulator 111 from the door to the outside of the safety cabin 105, and (10) closing the door 117 of the safety cabin 105.

Incidentally, the whole processing time required for cutting one work W by the laser beam machining in the above manner was, for example, 30 seconds. The breakdown was such that pure laser beam machining time in the steps (1) and (6) was for example 12 seconds, and the pick-up time of the work W and the opening and closing time of the door 117 in other steps (2) to (5) and (7) to (10) were for example 18 seconds.

As described above, there is a problem in that the productivity decreases, since the time for suspending the laser beam machining becomes long, as the laser beam machining is performed within the safety cabin 105.

DISCLOSURE OF INVENTION

The present invention has been achieved in order to solve the above problems, and it therefore is the object of the present invention to provide a laser beam machining system and a laser beam machining method, using this laser beam machining system, wherein the working environment for the laser beam machining in the safety cabin is not impaired, and carrying out of the machined work can be performed without causing a shift of the machined work on the machining table, and also, without the laser beam machining being suspended, thereby enabling improvement in the productivity.

In order to achieve the above object, a first aspect of the present invention provides the laser beam machining system, wherein a machining area and an accumulation area adjacent to the machining area are provided in a safety cabin, a machining table is disposed in the machining area, and first and second carriages disposed on the opposite sides of the machining area are provided movably back and forth, located above the machining table, a laser machining head movable in the left and right direction is disposed in the first carriage, and a machining head movable in the left and right direction and a holding device for holding a work on the machining table are disposed in the second carriage.

Accordingly, the feature of double carriages in the safety cabin can be fully utilized, and even in the middle of cutting a work by the laser machining head provided in the first carriage, the work is picked up by the holding device provided in the second carriage, and the machined work is carried out to the accumulation area in the safety cabin. As a result, the working environment for the laser beam machining is not impaired, and carrying out of the machined work can be performed without causing a shift of the machined work on the machining table, and also, without the laser beam machining being suspended, thereby enabling improvement in the productivity.

A second aspect of the present invention provides the laser beam machining system according to the first aspect, wherein the machining head in the second carriage comprises at least one of a laser machining head, a marking head, or a drilling head.

Accordingly, with the second carriage, not only carrying out of the work by means of the holding device, but also other machining can be performed, such as laser beam machining, marking or drilling.

A third aspect of the present invention provides the laser beam machining system according to the first or second aspect, wherein an opening for carrying out a work is provided on the side of the safety cabin, and a work transport means capable of carrying a work from inside of the safety cabin to the outside through the opening is provided in the accumulation area.

Therefore, the machined work accumulated in the safety cabin can be carried out easily and quickly by the work transport means through the opening. Carrying out at this time is performed during a set-up change, and does not affect the productivity.

A fourth aspect of the present invention provides the laser beam machining system according to the third aspect, wherein a freely openable door or an air curtain is arranged in the opening.

Therefore, by providing the freely openable door in the opening, laser beam machining can be performed without impairing the working environment in the safety cabin. Moreover, by providing the air curtain, continuous carrying out of the work is possible without impairing the working environment in the safety cabin.

A fifth aspect of the present invention provides the laser beam machining system, wherein at least one carriage is provided movably back and forth, located above a machining table in a safety cabin whose upper portion is released, a laser machining head movable right and left is disposed in the at least one carriage, and a takeout loader is provided, which comprises a holding device for holding a work on the machining table from the release portion on the upper part of the safety cabin, so as to be movable vertically and substantially horizontally above the safety cabin.

Therefore, since carrying out of the work is performed from the release portion on the upper part of the safety cabin by means of the holding device in the takeout loader, the working environment for the laser beam machining is not impaired, and carrying out of the machined work can be performed without causing a shift of the machined work on the machining table, and also, without the laser beam machining being suspended, thereby enabling improvement in the productivity.

Moreover, it is also effective in the case of using a single carriage, and it is possible to carry out the works to the outside of the safety cabin all at once, without accumulating the works in the safety cabin. In the case of double carriages, it is possible to be involved in other machining such as laser beam machining, marking or drilling with the other second carriage.

A sixth aspect of the present invention provides the laser beam machining system according to either one of the first to sixth aspects, wherein the machining table is a shuttle table.

Therefore, the time for carrying out the machined work to the outside of the safety cabin is reduced. As a result, this shuttle table can be effectively utilized, without delaying the time for a set-up change.

A seventh aspect of the present invention provides the laser beam machining method, wherein at least one of first and second carriages placed in a safety cabin is moved in the back and forth direction above a machining table, while a laser machining head provided in the at least one carriage is moved in the left and right direction to thereby perform laser beam machining on a work on the machining table, and the second carriage is moved in the back and forth direction above the machining table, while a holding device provided in the second carriage is moved in the left and right direction to hold the machined work to thereby transport the work to an accumulation area in the safety cabin.

Accordingly, the feature of double carriages in the safety cabin can be fully utilized, and the machined work is carried out to the accumulation area in the safety cabin, by the holding device provided in the other second carriage. As a result, the working environment for the laser beam machining is not impaired, and carrying out of the machined work can be performed without causing a shift of the machined work on the machining table, and also, without the laser beam machining being suspended, thereby enabling improvement in the productivity.

An eighth aspect of the present invention provides the laser beam machining method according to the seventh aspect, wherein, when laser beam machining is performed on the work on the machining table by the laser machining head provided in at least one of the first and second carriages, after having performed laser beam machining until the work becomes a condition that it can be picked up, the cut portion of the work is picked up by the holding device provided in the second carriage, the final cut portion of the work is again subjected to laser beam machining by the laser machining head provided in the at least one carriage, and this machined work is held by the holding device provided in the second carriage to thereby be carried to the accumulation area.

Therefore, since pickup is performed by the holding device provided in the second carriage, even in the middle of cutting a work by the laser machining head provided in the first carriage, even if the final out portion is cut thereafter, the machined work can be carried out efficiently by the holding device in the second carriage, without causing a shift of the machined work on the machining table.

A ninth aspect of the present invention provides the laser beam machining method according to the seventh or eighth aspect, wherein the machined work to be carried by the holding device in the second carriage is accumulated in the accumulation area within the safety cabin, and after a desired number of works have been machined, the accumulated works are carried out to the outside through an opening provided on the side of the safety cabin.

Since the machined work is accumulated in the accumulation area in the safety cabin, the working environment for the laser beam machining is not impaired. Moreover, since the laser beam machining is not suspended, the productivity is improved. When the accumulated machined works are carried out, it is necessary to open and close the door in the opening, necessarily from the purpose of the safety cabin. However, this carrying out can be performed during the set-up change, and hence the productivity is not affected.

A tenth aspect of the present invention provides the laser beam machining method, wherein at least one carriage placed in a safety cabin with the upper part being released is moved in the back and forth direction above a machining table, while a laser machining head provided in the carriage is moved in the left and right direction to thereby perform laser beam machining on a work on the machining table, and a holding device in a takeout loader provided above the safety cabin is moved up and down to hold and lift the machined work on the machining table from the release portion on the upper part of the safety cabin, to thereby carry the work to the outside of the safety cabin.

Therefore, it has the similar effect as that in the fifth aspect, and since carrying out of the work is performed from the release portion on the upper part of the safety cabin by means of the holding device in the takeout loader, the working environment for the laser beam machining is not impaired, and carrying out of the machined work can be performed without causing a shift of the machined work on the machining table, and also, without the laser beam machining being suspended, thereby enabling improvement in the productivity.

Moreover, it is also effective in the case of using a single carriage, and it is possible to carry out the work to the outside of the safety cabin all at once, without accumulating the works in the safety cabin. In the case of double carriages, it is possible to be involved in other machining such as laser beam machining, marking or drilling with the other second carriages.

An eleventh aspect of the present invention provides the laser beam machining method according to the seventh to tenth aspects, wherein the machining table is a shuttle table.

Therefore, it has the similar effect as that in the sixth aspect, and the time for carrying out the machined work to the outside of the safety cabin is reduced, and hence this shuttle table can be effectively utilized, without delaying the time for set-up change.

DESCRIPTION OF THE PREFERRED EMBODIMENTS

Embodiments of the laser beam machining system of the present invention and the laser beam machining method using this system will be described with reference to the drawings.

Figure 1:
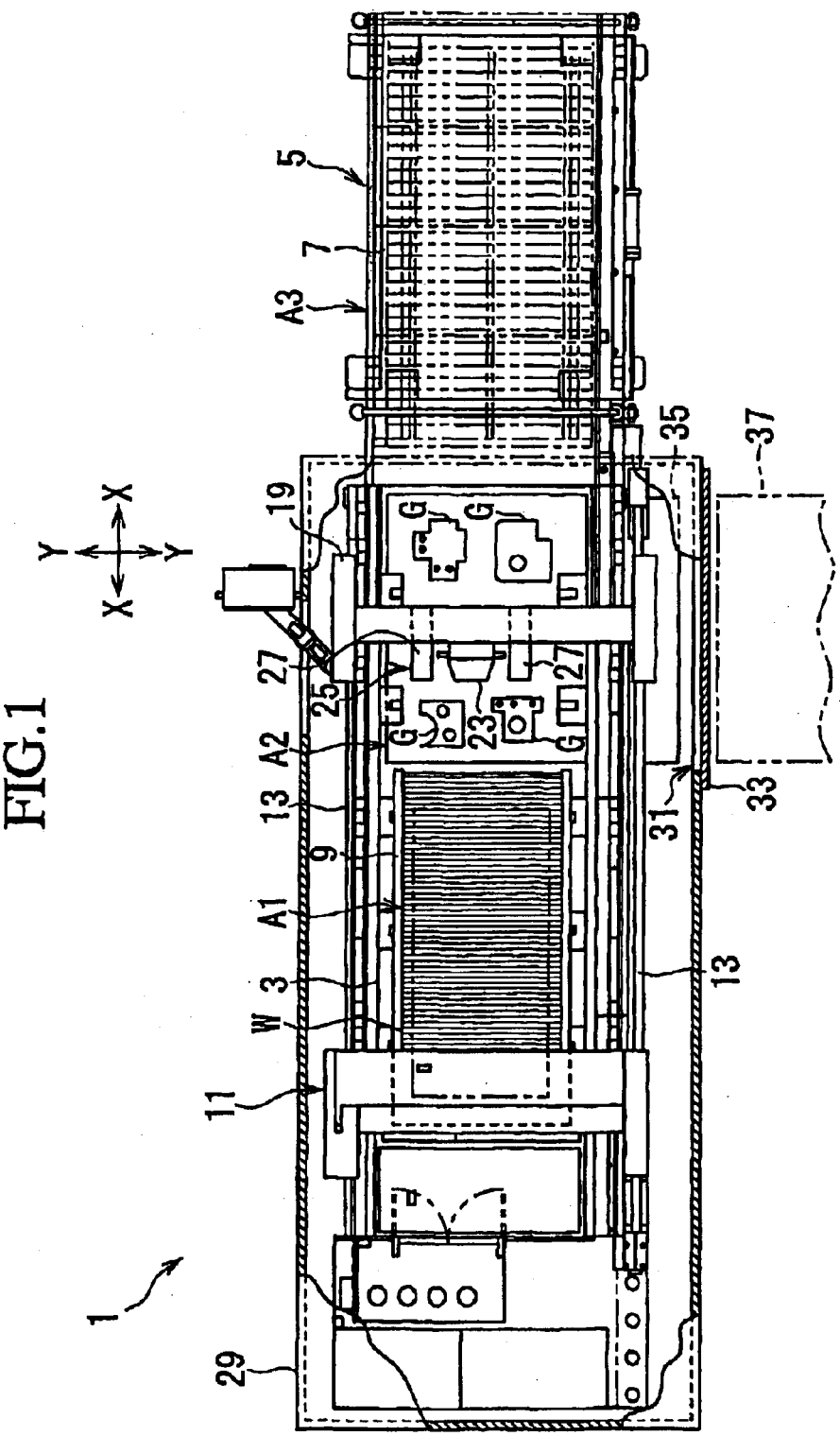
FIG. 1 is a plan view of an embodiment of a laser beam machining system in accordance with the present invention.
Figure 2:
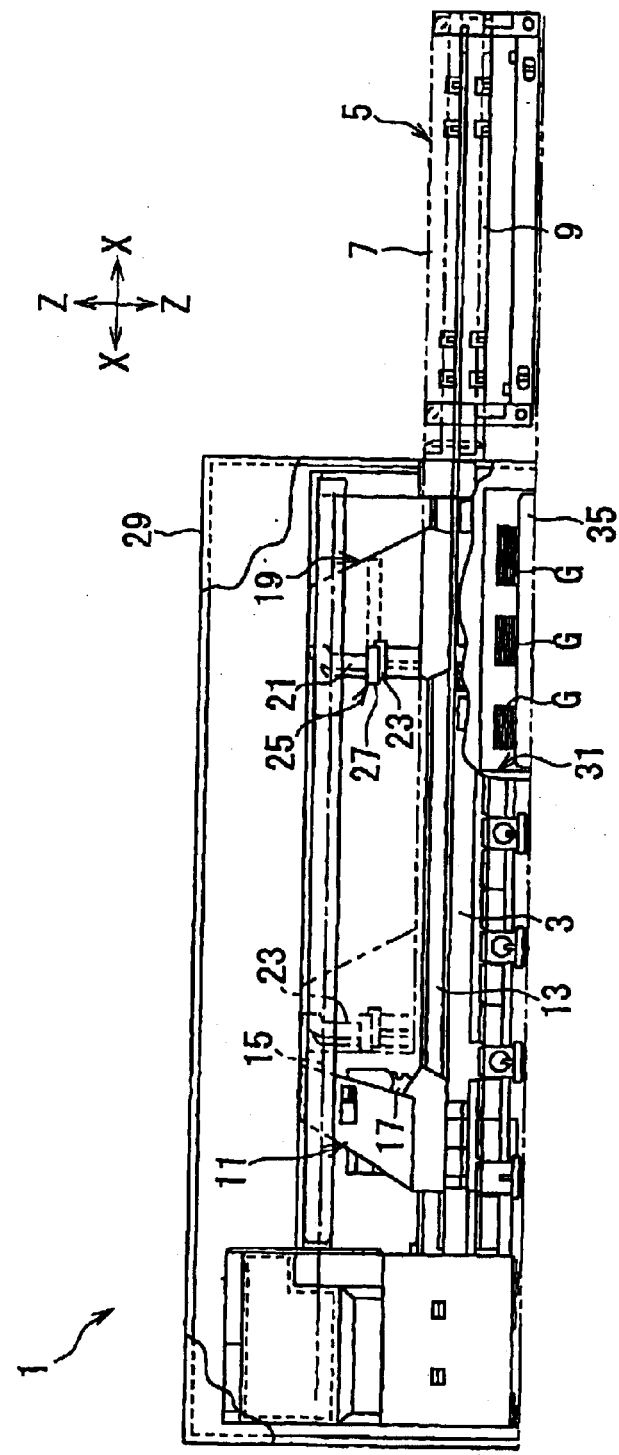
FIG. 2 is an elevation view of an embodiment of a laser beam machining system in accordance with the present invention.

Referring to FIG. 1 and FIG. 2, a laser beam machine 1 in this embodiment has a bed 3, and two-stage upper pallet 7 and lower pallet 9 constituting, for example, a shuttle table 5 as a machining table is provided on the bed 3, respectively, so as to be able to move horizontally and back and forth (right and left, in the X-axis direction in FIG. 1 and FIG. 2).

With the upper pallet 7 and the lower pallet 9, the set-up of a work W on the pallet 7, 9 is performed at area A3, and laser beam machining is performed on the set work W with the other pallet at Area A1. For example, as shown in FIG. 1, the lower pallet 9 is moved to the laser beam machining area A1, and laser beam machining is performed with respect to the work W set on the lower pallet 9. The upper pallet 7 is moved to the outer set-up area A3 away from the laser beam machining area A1, to perform setting of the work W on the pallet 7, while laser beam machining is performed with the lower pallet 9.

Moreover, in FIG. 1 and FIG. 2, a first carriage 11 in a gate shape is provided on the left side of the bed 3, spanning over rails 13 extended in the X-axis direction on the both left and right sides (upper and lower sides in FIG. 1) of the bed 3. The first carriage 11 is located above the shuttle table 5, and it can be freely moved and positioned in the X-axis direction on the rails 13, by a first carriage drive motor (not shown) that is driven under control of a numerical control unit (NC unit).

In the first carriage 11, there is provided a Y-axis carriage 15 movable in the right and left direction (Y-axis direction) orthogonal to the X-axis direction; the carriage 15 can be freely moved and positioned by a Y-axis motor (not shown) driven under control of the NC unit. More specifically, a Y-axis ball screw (not shown) rotated and driven by the above Y-axis motor is extended in the Y-axis direction; the Y-axis ball screw is born by the first carriage 11. A laser machining head 17 which can be freely moved and positioned in the vertical direction (Z-axis direction) orthogonal to the X- and Y-axis directions is provided below the Y-axis carriage 15. The laser machining head 17 can be freely moved and positioned by a Z-axis motor (not shown) driven under control of the NC unit.

Moreover, a nozzle comprising a condenser lens (not shown) for laser beam machining is fitted at the bottom end of the laser machining head 17.

With the above construction, the laser beam emitted from a laser oscillator (not shown) and transmitted to the head 17 via a plurality of bend mirrors (not shown) is irradiated towards the work W from the nozzle at the bottom of the laser machining head 17. Therefore, when the upper pallet 7 or the lower pallet 9 on which the work W has been set is moved in the X-axis direction, while the laser machining head 17 is moved in the Y-axis direction or in the Z-axis direction, thereby laser beam machining is performed at a desired position of the work W.

In addition, on the right side of the first carriage 11 in FIG. 1 and FIG. 2, a second carriage 19 in a gate shape having substantially the same structure as that of the first carriage 11 is provided, spanning over the rails 13 on the bed 3, such that it can be freely moved and positioned in the X-direction on the rails 13 by a second carriage drive motor (not shown) driven under control of the NC unit.

Moreover, in the second carriage 19, there is provided a Y-axis carriage 21 having a similar construction to that of the Y-axis carriage 15 in the above-described first carriage 11; the carriage 21 is freely moved and positioned in the Y-axis direction. A laser machining head 23 having a similar construction to that of the laser machining head 17 of the above-described first carriage 11 is provided below the Y-axis carriage 21 so as to be freely moved and positioned in the Z-axis direction.

Laser beam machining by means of the laser machining head 23 in the second carriage 19 is the same as that by the first carriage 11 described above.

Moreover, on the second carriage 19, a stretch 27 of a holding device 25 for holding a work W on the shuttle table 5 is provided on the lower surface of the Y-axis carriage 21 on the both sides of the laser machining head 23; the stretch 27 is able to go up and down freely. This holding device 25 can be freely moved and positioned by the Z-axis motor (not shown) driven under control of the NC unit. When laser beam machining is performed by the laser machining head 23, the holding device 25 is positioned above a position at the bottom of the laser machining head 23, and when the work W is held by the holding device 25, the laser machining head 23 is positioned above the position of the holding device 25.

As the holding device 25, a plurality of vacuum pads (not shown) sucked by air vacuum are provided on the bottom face of the stretch 27 that is moved up and down by, for example, a Z-axis motor for holding device.

In addition, in the second carriage 19, devices such as a marking head or a drilling head may be provided other than the above described laser-machining head 23.

Referring to FIG. 1 and FIG. 2, the whole traveling range of the first carriage 11 and the second carriage 19 is covered with the safety cabin 29. In the safety cabin 29, there are provided a laser beam machining area A1 for performing laser beam machining on the work W on the left side in FIG. 1, and a work accumulation area A2 for accumulating the machined works W (products G in FIG. 1) on the right side.

As shown in FIG. 2, since this work accumulation area A2 is located at a lower position than the traveling position of the upper and lower pallets 7, 9 of the shuttle table 5, there is no problem. Moreover, an opening 31 for taking out the machined works W (products G) accumulated in the work accumulation area A2 is provided on the side of the safety cabin 29 facing the work accumulation area A2, and a door 33 for opening and closing this opening 31 is also provided.

In the work accumulation area A2, for example, a first conveyor device 35 may be arranged as the work transport means, and a second conveyor device 37 capable of carrying the works W from the first conveyor device 35 may be provided outside of the opening 31. In this case, the door 33 may be provided at the opening 31, as described above, but an air curtain may be provided.

Alternatively, a work accumulation pallet may be provided in the work accumulation area A2. In this case, a forklift or the like may take out works W.

With the above construction, when one of the upper and lower pallets 7, 9 of the shuttle table 5 is located in the laser beam machining area A1, machining of the work W set on the upper pallet 7 or on the lower pallet 9 is performed by means of laser beam from one of the laser machining head 17 or 23 on the first and second carriages 11, 19. In this embodiment, laser beam machining may be performed by the laser machining head 17 of the first carriage 11, but laser beam machining may be performed by both of the first and second carriages 11, 19.

Figure 6:
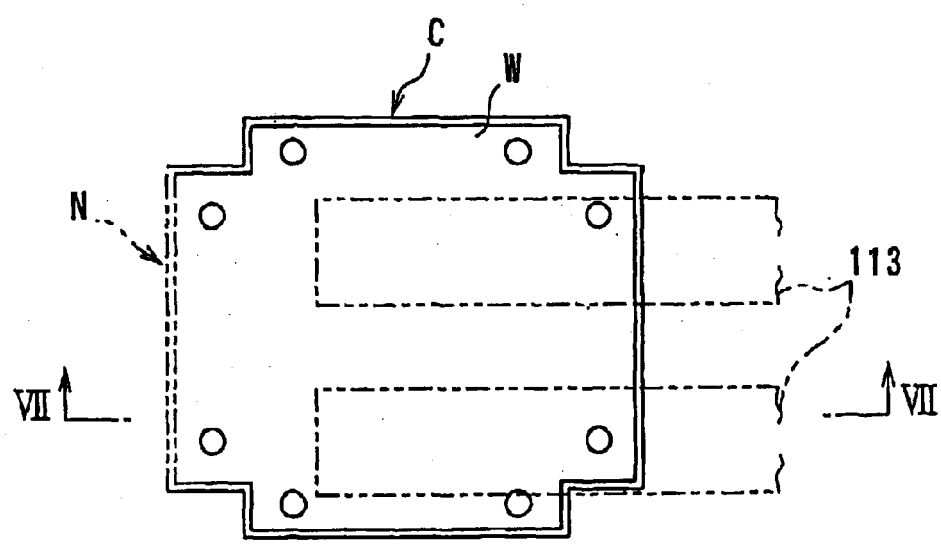
FIG. 6 is a plan view for explaining the operation of a conventional laser beam machining system.
Figure 7:
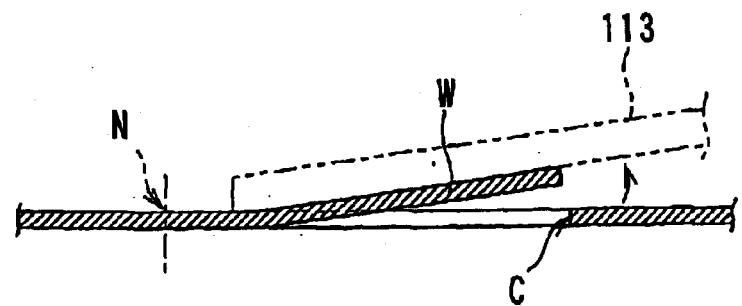
FIG. 7 is a partial sectional view taken along the line VII—VII in the direction of an arrow.

At this time, laser beam machining is performed up to the middle of the cutting length of the work W. That is to say, the work W is cut until a cut portion of the work W becomes a condition that it can be picked up. Explaining it by using FIG. 6 and FIG. 7 which have been used for explaining the conventional system, laser beam machining is suspended, slightly leaving the uncut portion N, as shown in FIG. 6. Then, the holding device 25 of the second carriage 19 (corresponding to reference symbol 113 in FIG. 6 and FIG. 7) approaches the work W, and the side of the cut portion C of the work W in FIG. 6 is picked up by the holding device 25 in the direction of an arrow, as shown in FIG. 7. In FIG. 7, this condition is exaggerated for easy understanding.

Thereafter, the second carriage 19 is retreated, and the remaining uncut portion N is cut by laser beam from the laser machining head 17 of the first carriage 11.

After the laser beam machining has been finished, and when the first carriage 11 is retreated, the second carriage 19 approaches the work W, and the machined work W is held and lifted by the holding device 25, and carried and accumulated on, for example, the first conveyor device 35 in the accumulation area A2.

Meanwhile, laser beam machining is performed on the next work W by the laser machining head 17 of the first carriage 11, and the above machining is repeated.

At the time of unloading the machined works W (products G) accumulated in the above work accumulation area A2, it is necessary to open or close the door 33 of the opening 31, in view of the purpose of the safety cabin 29. However, this unloading may be performed during a set-up period, such as the period for replacing the upper and lower pallets 7, 9 of the shuttle table 5, and does not affect the productivity.

Moreover, by providing an air curtain, works W can be carried out continuously, without impairing the working environment in the safety cabin 29.

As described above, a series of steps of the above-described cutting process comprise: (1) performing laser beam machining on a work W halfway by the laser machining head provided in at least one carriage of the first and second carriages 11, 19; (2) picking up the work W by the holding device 25 of the second carriage 19; (3) machining the remaining portion of the work W by the laser machining head disposed in the carriage; and (4) the machined work W is taken out by the holding device 25 of the second carriage 19 and accumulated in the work accumulation area A2.

Incidentally, the whole tact time required for cutting one work W by the laser beam machining using the above method was, for example, 17 seconds. The breakdown was such that pure laser beam machining time in the steps (1) and (3) was for example 12 seconds, and the pick-up time of the work W in other steps (2) and (4) was for example 5 seconds. In the conventional method, the whole machining time is for example 30 seconds, and hence, the present invention enables great reduction in the tact time.

Moreover, the feature of double carriages can be fully utilized in the safety cabin 29, such that the holding device 25 disposed in the second carriage 19 performs the pickup of the work W in the middle of cutting the work W and the unloading of the machined work W (product G). As a result, the unloading of the machined work can be performed without impairing the working environment for the laser beam machining, without the laser beam machining being suspended, and without causing a shift of the machined work on the upper and lower pallets 5, 9, thereby enabling great improvement in the productivity.

Next, a laser beam machining method and a laser beam machining system in another embodiment of the present invention will be described, with reference to the drawings. The laser beam machine 1 in this embodiment is basically the same as the laser beam machine 1 in the above-described embodiment shown in FIG. 1 and FIG. 2. Therefore, members same as those shown in FIG. 1 and FIG. 2 are denoted by the same reference symbols, and only the different points will be described.

Figure 3:
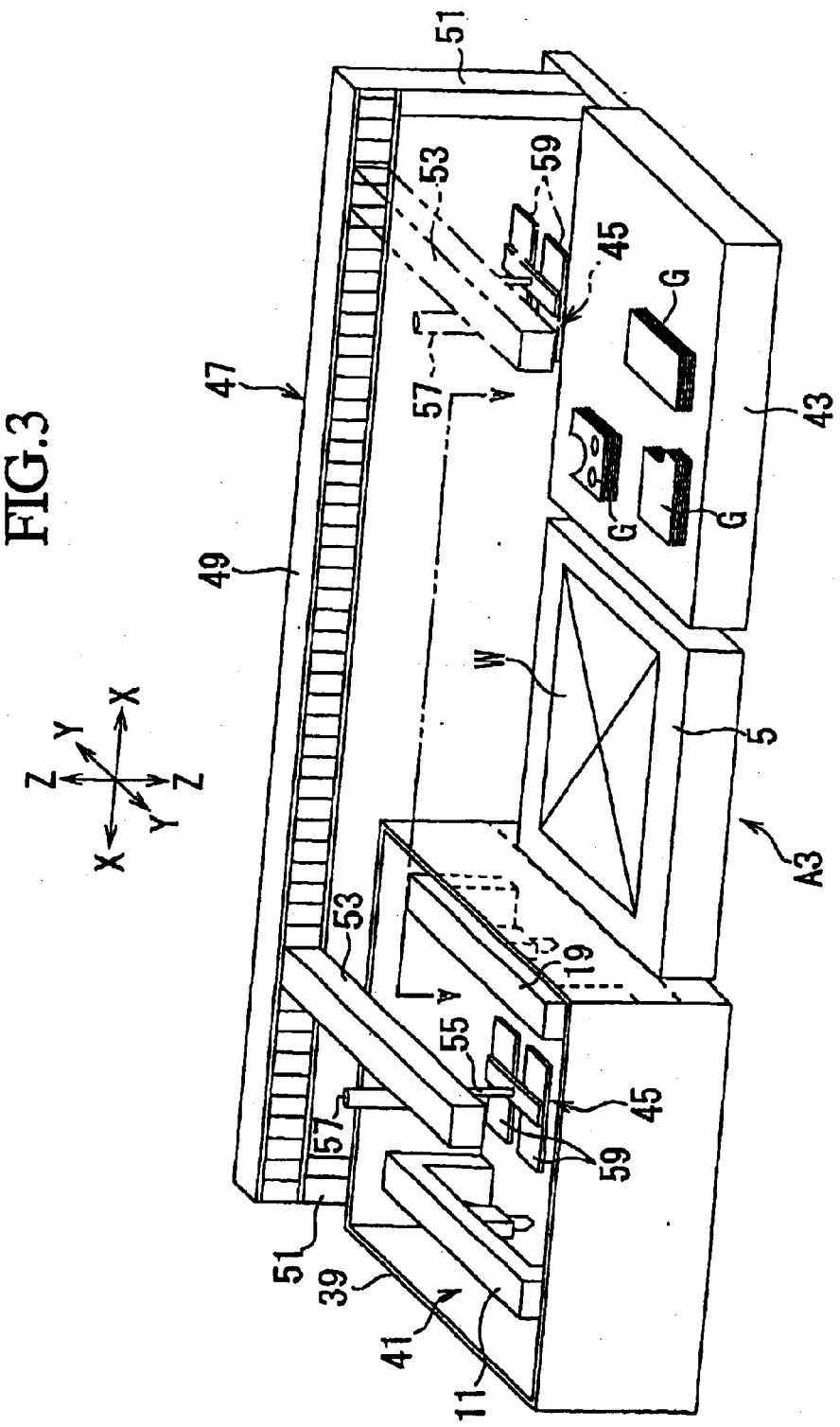
FIG. 3 is a perspective view of another embodiment of a laser beam machining system in accordance with the present invention.
Figure 4:
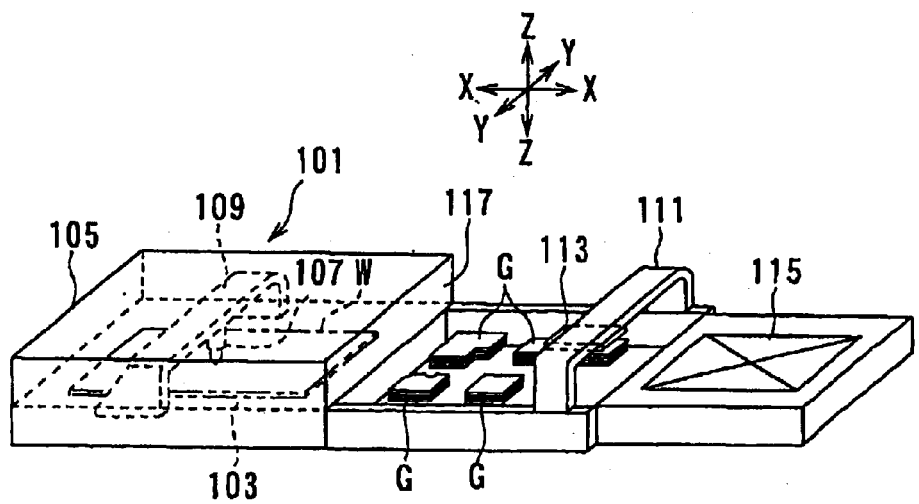
FIG. 4 is a schematic perspective view of a conventional entire laser beam machining system.
Figure 5:
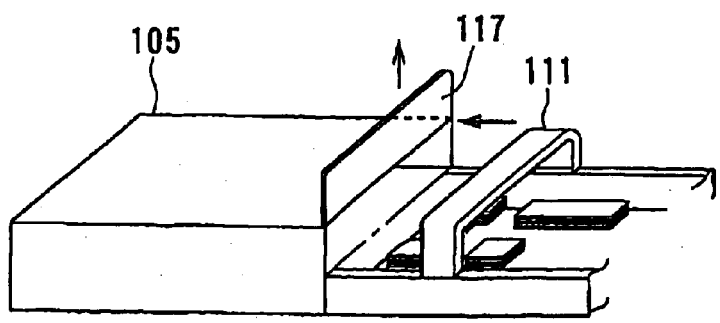
FIG. 5 is a partial perspective view for explaining the operation of a conventional laser beam machining system.

Referring to FIG. 3, a safety cabin 39 has an open portion 41 with the upper part is open. Harmful fume due to dust collection during laser beam machining is reliably drawn downwards, and hence there is no worry that the working environment is damaged, there may be no upper lid in the safety cabin 39.

In the safety cabin 39, there are provided two carriages, that is, first and second carriages 11, 19. A work accumulation area 43 for accumulating machined works W (product G in FIG. 3) is provided on the right side in FIG. 3 of the shuttle table 5 located in the set-up area A3 outside the safety cabin 39.

The safety cabin 39 and work accumulation table 43 in FIG. 3, a takeout loader 47 like an overhead traveling crane is provided; the loader 47 has a holding device 45 for holding a work W on one of the upper and lower tables 7, 9 installed in the safety cabin 39.

Specifically, a takeout rail 49 extending substantially horizontally, from the position of the safety cabin 39 to the position rightward in the X-axis direction in FIG. 3, is arranged in a standing condition. A cantilever-type takeout body 53 of the takeout loader 47 is set up on the takeout rail 49 so as to be able to reciprocate.

A takeout ball screw (not shown) rotated and driven by a takeout motor (not shown) is born inside of the takeout rail 49, and a nut member provided in the takeout body 53 is screwed together with the takeout ball screw. Therefore, the takeout body 53 is reciprocated in the X-axis direction along the takeout rail 49 by the reciprocal rotation of the takeout motor.

Moreover, a lift cylinder 57 comprising a piston rod 55 movable in the vertical direction is provided in the takeout body 53, so as to be moved and positioned freely in the Y-axis direction. Plane stretches 59 extending in the Y-axis direction are provided at the bottom of the piston rod 55, and a plurality of vacuum pads (not shown) for holding the work W are provided on the bottom face of the stretches 59.

With the above construction, laser beam machining is performed on a work W in the safety cabin 39, in the similar manner as in the above-described embodiment shown in FIG. 1 and FIG. 2. In the step (2) of the series of steps (1) to (4) in the cutting process, the work W is picked up by the holding device 45 of the takeout loader 47. Also in the step (4), after the machined work W has been held and lifted by the holding device 45 of the takeout loader 47, which is moved downward through the open portion 41 of the safety cabin 39, the takeout body 53 is moved by means of the rotation of the takeout motor, thereby the machined work W (product G) is carried to and accumulated on the work accumulation table 43.

The operation and effects in this embodiment are basically the same as those of the laser beam machine 1 in the embodiment shown in FIG. 1 and FIG. 2 described above. In FIG. 3, the description has been made for a case of double carriages, but it is also effective with the single carriage, and it is possible to unload works all at once onto the work accumulation table 43, without accumulating the works inside of the safety cabin 39. In the case of double carriages, for example, the second carriage 19 can be involved in other machining, such as laser beam machining, marking or drilling.

The present invention is not limited to the above-described embodiments, and can be executed in other embodiments, by applying appropriate modifications.

As is understood from the description of the preferred embodiments described below, according to the first aspect of the invention, the feature of double carriages in the safety cabin can be fully utilized, and the work is picked up by the holding device provided in the second carriage, during cutting the work, and the machined work is carried out to the accumulation area in the safety cabin. As a result, the working environment for the laser beam machining is not impaired, and carrying out of the machined work can be performed without causing a shift of the machined work on the machining table, and also, without the laser beam machining being suspended, thereby enabling improvement in the productivity.

According to the second aspect of the invention, with the second carriage, not only carrying out of the work by means of the holding device, but also other machining can be performed, such as laser beam machining, marking or drilling.

According to the third aspect of the invention, the machined work accumulated in the safety cabin can be carried out easily and quickly by the work transport means through the opening. Carrying out is performed during a set-up change, without affecting the productivity.

According to the fourth aspect of the invention, by providing the freely openable door in the opening, laser beam machining can be performed without impairing the working environment in the safety cabin. Moreover, by providing the air curtain, continuous carrying out of the work is possible without impairing the working environment in the safety cabin.

According to the fifth aspect of the invention, since carrying out of the work is performed by means of the holding device in the takeout loader, the working environment for the laser beam machining is not impaired, and carrying out of the machined work can be performed without causing a shift of the machined work on the machining table, and also, without the laser beam machining being suspended, thereby enabling improvement in the productivity.

Moreover, it is also effective in the case of using a single carriage, and it is possible to carry out the works to the outside of the safety cabin all at once, without accumulating the works in the safety cabin. In the case of double carriages, it is possible to be involved in other machining such as laser beam machining, marking or drilling with the other second carriage.

According to the sixth aspect of the invention, the time for carrying out the machined work to the outside of the safety cabin is reduced. As a result, this shuttle table can be effectively utilized, without delaying the time for set-up change.

According to the seventh aspect of the invention, the feature of double carriages in the safety cabin can be fully utilized, and the machined work is carried out to the accumulation area in the safety cabin, by the holding device provided in the other second carriage. As a result, the working environment for the laser beam machining is not impaired, and carrying out of the machined work can be performed without causing a shift of the machined work on the machining table, and also, without the laser beam machining being suspended, thereby enabling improvement in the productivity.

According to the eighth aspect of the invention, since pickup is performed by the holding device provided in the second carriage in the middle of cutting a work, even if the final cut portion is cut thereafter, the machined work can be carried out efficiently by the holding device in the second carriage, without causing a shift of the machined work on the machining table.

According to the ninth aspect of the invention, since the machined work is accumulated in the accumulation area in the safety cabin, the working environment for the laser beam machining is not impaired. Moreover, since the laser beam machining is not suspended, the productivity is improved. Carrying out of the accumulated machined works is performed during the set-up change, and hence the productivity is not affected.

According to the tenth aspect of the invention, it has the similar effect as that in the fifth aspect, and since carrying out of the work can be performed by means of the holding device in the takeout loader, the working environment for the laser beam machining is not impaired, and carrying out of the machined work can be performed without causing a shift of the machined work on the machining table, and also, without the laser beam machining being suspended, thereby enabling improvement in the productivity.

Moreover, it is also effective in the case of using a single carriage, and it is possible to carry out the works to the outside of the safety cabin all at once, without accumulating the works in the safety cabin. In the case of double carriages, it is possible to be involved in other machining such as laser beam machining, marking or drilling with the other second carriage.

According to the eleventh aspect of the invention, it has the similar effect as that in the sixth aspect, and the time for carrying out the machined work to the outside of the safety cabin is reduced, and hence this shuttle table can be effectively utilized, without delaying the time for set-up change.

What is claimed is:

1. A laser beam machining system, wherein a machining area and an accumulation area adjacent to the machining area are provided in a safety cabin; a machining table is disposed in said machining area; and first and second carriages disposed on the opposite sides of said machining area are provided movably back and forth, located above the machining table; a laser machining head movable in the left and right direction is disposed in said first carriage; and a machining head movable in the left and right direction and a holding device for holding a work on the machining table are disposed in said second carriage.

2. A laser beam machining system according to claim 1, wherein said machining head in the second carriage comprises at least one of a laser machining head, a marking head, or a drilling head.

3. A laser beam machining system according to claim 1, wherein an opening for unloading a work is provided on the side of said safety cabin, and a work transport means capable of unloading a work from inside of the safety cabin to the outside through said opening is provided in said accumulation area.

4. A laser beam machining system according to claim 3, wherein a freely openable door or an air curtain is arranged in said opening.

5. A laser beam machining system wherein first and second carriages are provided movably back and forth, located above a machining table in a safety cabin whose upper portion is open, a laser machining head movable right and left is disposed in at least one of said first and second carriages, and an unloader is provided, which comprises a holding device for holding a work on the machining table from the open portion on the upper part of said safety cabin, so as to be movable vertically and substantially horizontally above said safety cabin.

6. A laser beam machining system according to claim 1, wherein said machining table is a shuttle table.

7. A laser beam machining system wherein first and second carriages are provided movably back and forth, located above a machining table in a safety cabin whose upper portion is open, and an unloader is provided, which comprises a holding device for holding a work on the machining table from the open portion on the upper part of said safety cabin, so as to be movable vertically and substantially horizontally above said safety cabin.

* * * * *